United States Patent [19]

Nickel

[11] 4,434,743
[45] Mar. 6, 1984

[54] SHELLFISH MARICULTURE APPARATUS

[76] Inventor: William F. Nickel, R.F.D. 1 Box 262, Melfa, Va. 23410

[21] Appl. No.: 376,652

[22] Filed: May 10, 1982

Related U.S. Application Data

[63] Continuation-in-part of Ser. No. 208,464, Nov. 19, 1980, Pat. No. 4,328,764.

[51] Int. Cl.³ ............................................. A01K 61/00
[52] U.S. Cl. ........................................................ 119/4
[58] Field of Search .................................... 119/4, 3, 2

[56] References Cited

U.S. PATENT DOCUMENTS

| | | | |
|---|---|---|---|
| 3,996,894 | 12/1976 | Wiegardt, Jr. | 119/4 |
| 4,170,197 | 10/1979 | Walker | 119/4 |
| 4,231,322 | 11/1980 | Gilpatric | 119/4 |
| 4,328,764 | 5/1982 | Nickel | 119/4 |

Primary Examiner—Hugh R. Chamblee
Attorney, Agent, or Firm—Bradford E. Kile

[57] ABSTRACT

A shellfish mariculture apparatus wherein the apparatus includes a frame, an envelope comprising a sleeve of open mesh material having an upper and lower portion and a series of stanchions operably connected to the frame for supporting an upper portion of the sleeve and a means operably contacting an upper portion of the sleeve for elevating the upper portion of the sleeve above the lower portion thereof above.

12 Claims, 7 Drawing Figures

SHELLFISH MARICULTURE APPARATUS

RELATED PATENT

This is a continuation-in-part of applicant's copending application Ser. No. 208,464 entitled "Shellfish Mariculture Method and Apparatus," now U.S. Pat. No. 4,328,764.

DESCRIPTION

Technical Field

This invention relates to nurturing shellfish such as clams, oysters, scallops and the like from an infantile seed stock stage to commercial maturity.

Shellfish have long been prized as source of edible protein. Over the decades a substantial industry has evolved which is devoted to the nurturing of infantile or seed shellfish to commercial maturity in an aquatic environment. At least for purposes of this description such shellfish husbandry will be referred to as "mariculturing."

In the art of mariculturing, seed stock or infantile shellfish, such as clams, are purchased from hatcheries in containers of ten to fifteen thousand each. The typical size of such seed stock ranges from 10 mm. down to 4 mm. or smaller. In the past, the seed clams would be kept alive in the containers until lowest tides were realized. In this regard, at low tides, sections of an aquatic bed can be cleared of predators such as crabs, the seeds can be planted and a protective net laid over the infantile shellfish for protection. If the planting beds never ebb bare it is, for all practical purposes, impossible to prevent small crabs from invading the growing bed and feeding on the clams beneath the protective nets. If the seed stock is fortunate enough to survive to commercial maturity of 25 to 30 mm., harvesting is achieved by commercial digging techniques.

Although the art of culturing shellfish has been widely practiced, significant disadvantages exist which impair economic development of the art. In this regard, hatcheries typically have a relatively inexpensive and plentiful supply of 4 mm. or smaller clams. This size, however, exhibits an extremely high mortality rate when cultured by conventional techniques and is extremely difficult to successfully nurture in the field. Ten mm. clams are past a critical growth stage and thus are relatively easy to nurture to maturity. Hatcheries, however, typically have only a sporadic supply of such seed which, when available, is sold at a significantly elevated price.

Some of the reasons for the high mortality rate of small shellfish comprise marine fouling, metabolic wastes and predators. Marine fouling slows water flow and thus shellfish growth and mats a covering net down, possibly smothering the seed. Marine fouling also resists wave and current action thus increasing the chance of a covering net being torn to expose the underlying shellfish to predators. In addition, infantile shellfish tend to silt themselves with their own metabolic wastes which provides a disease medium for small seeds. Further, and as previously suggested, predators such as crabs eat the shellfish seed. The crabs pass through conventional screens and nets as megalops or tiny crabs and, with a faster growth rate than shellfish, molt to a problem size.

The difficulties suggested in the preceding are not intended to be exhaustive, but rather are among many which may tend to reduce the effectiveness of prior methods and apparatus for culturing shellfish. Other noteworthy problems may also exist; however, those presented above should be sufficient to demonstrate that mariculture systems appearing in the past will admit to worthwhile improvement.

A significant advance in the art was achieved by the conception and reduction to practice of applicant's prior shellfish mariculture method and apparatus as disclosed in applicant's above identified U.S. Pat. No. 4,328,764. The disclosure of this document is, hereby, incorporated by reference as though set forth at length.

Notwithstanding the advantages provided by applicant's prior invention, it would be further desirable to provide an improved stanchion assembly operable to support a frame member above the bed of a body of water. It would also be desirable to enhance the apparatus for maintaining an open mesh mariculture envelope separated so as to enhance growth of shellfish within the envelope.

OBJECTS OF THE INVENTION

It is therefore a general object of the invention to provide a novel, mariculture apparatus which will obviate or minimize difficulties of the type previously described and provide enhanced structural features to facilitate use of the apparatus.

It is a specific object of the invention to provide a shellfish mariculture apparatus which can be advantageously utilized to nurture infantile 4 mm. or smaller shellfish to commercial maturity.

It is a further object of the invention to provide a shellfish mariculture apparatus which is adaptable to a variety of aquatic areas and conditions.

It is another object of the invention to provide a shellfish mariculture method and apparatus which is economical to fabricate, durable in an aquatic environment and facilely maintained.

It is yet a further object of the invention to provide a shellfish mariculture apparatus for nurturing 4 mm. or smaller infantile seed stock by:
  a. denying access to predators such as large crabs;
  b. minimizing marine fouling;
  c. facilitating elimination of metabolic wastes and small crabs;
  d. minimizing ice damage; and
  e. minimizing the deleterious impact of wave, current and tidal aquatic action.

It is still another object of the invention to provide a shellfish mariculture apparatus which facilitates placement, movement, inspection and harvesting of the shellfish.

It is yet still a further object of the invention to provide a shellfish mariculture apparatus wherein the rate of shellfish growth may be regulated to a degree to take advantage of market conditions.

It is another object of the invention to provide a portable stanchion assembly operable to advantageously support a mariculture envelope above the bed of a body of water.

It is a further object of the invention to provide a highly rugged stanchion assembly which may be facilely secured at a desired site.

It is yet another object of the invention to provide an enhanced apparatus for maintaining separation of the top and bottom members of a mariculture envelope to enhance shellfish growth.

BRIEF SUMMARY OF A PREFERRED EMBODIMENT

A preferred embodiment of the invention which is intended to accomplish at least some of the foregoing objects entails a frame operable to be positioned within an aquatic environment. An envelope composed of an open mesh material is positioned upon the frame and operably enhouses infantile shellfish to be cultured. A spacer member is operably insertable within the interior of the envelope and maintains an upper portion of the envelope supported above a lower portion thereof to provide a flexible chamber for the shellfish to grow which will be readily accessible to the ingress and egress of ambient water. Alternatively, a plurality of buoyant members are operably mounted to the upper portion of the envelope to buoyantly support the upper portion of the envelope. The frame is maintained above the water bed by a series of stanchion assemblies, composed of a series of generally rectangular frame members on truncated pyramid members.

BRIEF DESCRIPTION OF DRAWINGS

Other objects and advantages of the invention will become apparent from the following detailed description of a preferred embodiment thereof taken in conjunction with the accompanying drawings, wherein:

FIG. 1 is an axonometric view of a shellfish mariculture system of the subject invention positioned upon a water bed in two to three feet of water in a shallow estuary or the like;

DETAILED DESCRIPTION

Figure 1:
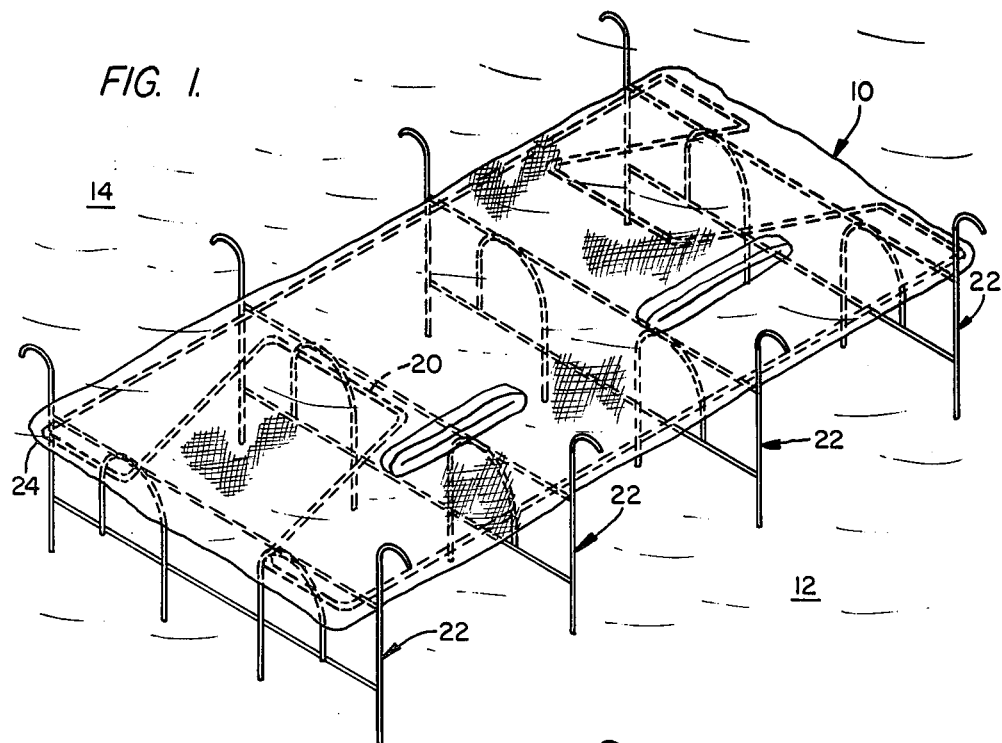

Referring now to the drawings, wherein like numerals designate like parts, FIG. 1 discloses a shellfish mariculture apparatus 10 in accordance with one preferred embodiment of the subject invention positioned upon the bed 12 of an estuary in two or three feet of water 14. In this preferred system, the mariculture apparatus is placed in water 18" to 0" at low tide, however, the subject apparatus may also be advantageously employed in water depths of 9' or deeper.

Figure 2:
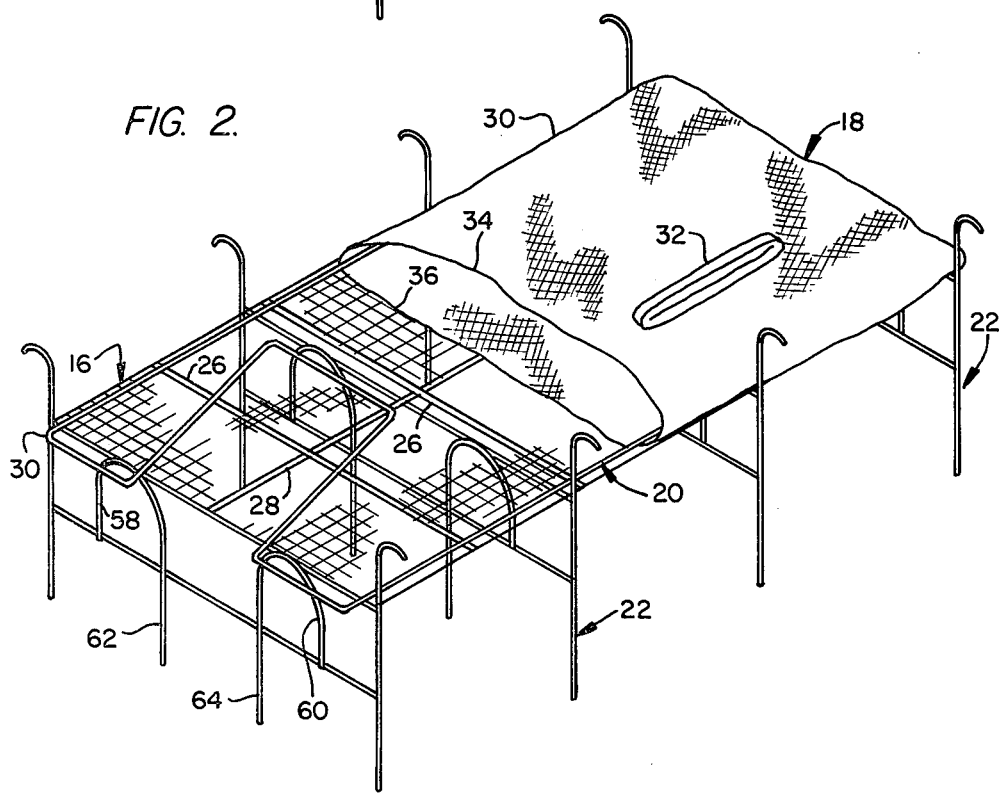
FIG. 2 is a detailed axonometric view of one preferred embodiment of the shellfish mariculture system which has been partially broken away to reveal internal detail of the subject system.

Referring to FIG. 2 it will be seen that the shellfish mariculture apparatus (depicted in FIG. 1) includes a generally rectangular frame 16, an open mesh envelope 18, a three dimensional support element 20 and a plurality of stanchions 22 positioned in series partially within the water bed to support the frame in a generally horizontal posture above the water bed.

A rectangular frame 16 is supportingly received upon an upper portion of the stanchions 22 and includes an outer generally rectangular member 24 composed of bar stock or the like and a plurality of transversely crossing members or braces 26 and longitudinally extending supports 28. A relatively heavy rectangular sheet of mesh material 30 is mounted on top of the rectangular member 24 and braces 26 and 28. The sheet of mesh 34 serves as a support for the open mesh envelope 18 as will be discussed more fully below.

In a preferred embodiment, the rectangular sheet of mesh material 30 is selected to be oversized so as to permit individual mesh sections between adjacent braces 26 and 28 to be concave for retaining a generally even distribution of shellfish across the frame.

The open mesh envelope 18 is positioned upon and across the frame 16. This envelope 18 comprises a sleeve 30 of open mesh material such as Dupont's VEXAR plastic netting. The interstices of the netting are dimensioned to have an effective opening across an interstice less than that of the size of shellfish to be nurtured. A preferred size ratio is for the interstices to be one-half the size of the shellfish at the time of initiation of the culturing process. Accordingly when 4 mm. clams are being cultured, a one-eighth inch mesh is chosen. In this regard it has been found that if crab megalops enter the envelope which are only half the size of the shellfish seed stock the growth rate of the shellfish will be sufficient to keep ahead of the developing crabs. In addition the growth rate of the tiny crabs is significantly impaired in the relatively sterile environment of the envelope and crabs surrounding the net, which feed on fouling of the net, tend to eat smaller crabs before the smaller crabs enter the net. In some instances, however, it may be desirable to provide even smaller interstices openings down to one millimeter or less across.

The ends and one side of the sleeve 30 are selectively closed as by being rolled up a short distance and tied, note FIG. 2. One or more access tubes 32 of open mesh material are laterally installed into the envelope sleeve 30. These tubes 32 provide access to the interior of the envelope 20 during the placing of infantile shellfish, inspection during growth period, removal of an occasional predator, etc. The access tubes 32 are normally closed by being rolled up and tied and may be laterally dimensioned to receive a hand or the upper portion of a person's body as desired.

A support element 20 is inserted within the sleeve 18, before closing, and operably supports an upper portion of the sleeve above a lower portion 36 thereof. Accordingly the envelope 18 is held open to permit water to flow through the net and minimize fouling during the grow-out process.

Figure 3:
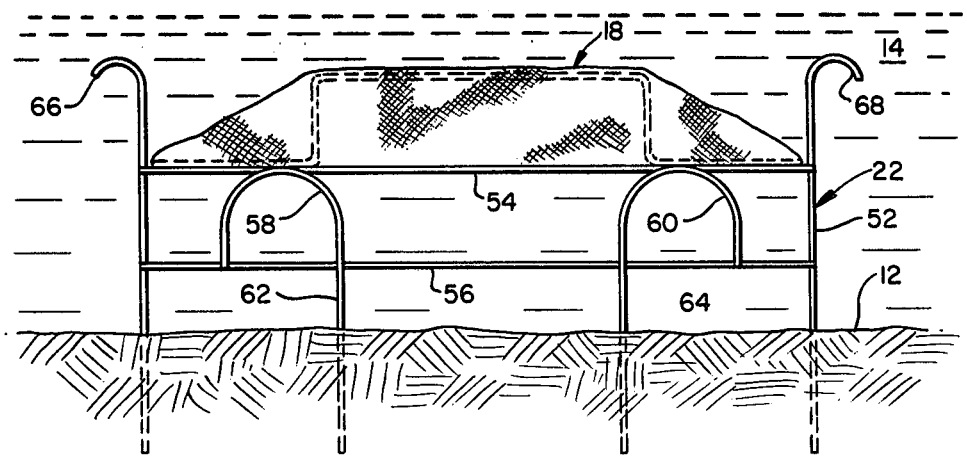
FIG. 3 is an plan view of a continuous rod elevating insert in accordance with the invention.
Figure 4:
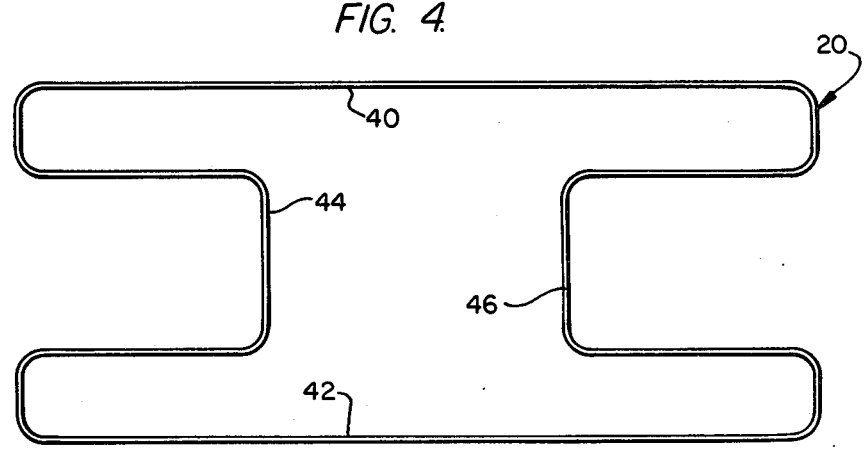
FIG. 4 is a side view of the insert depicted in FIG. 3.

The three dimensional element 20 comprises a continuous rod having a pair of generally parallel side lengths 40 and 42 and an elevated arcuate loop 44 and 46 extending between each end of the side lengths respectively (note FIGS. 3 and 4). The support element 20 is preferably fabricated from bar stock such as three eights reinforcing bar or smooth bar stock and may be coated to inhibit corrosion.

Figure 5:
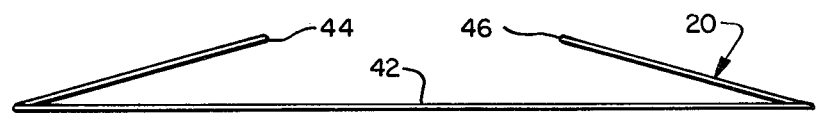
FIG. 5 is an end view of the mariculture apparatus depicted in FIG. 2.

Turning now to FIG. 5 there will be seen a front view of a stanchion 22 in accordance with one preferred embodiment of the invention. More specifically, the stanchion 22 includes a first pair of spaced parallel rods 50 and 52 which operably extend vertically within a body of water 14 and partially project into the seabed 12. A second pair of spaced parallel rods 54 and 56 extend between the vertical rods 50 and 52 in a generally horizontal posture intermediate the ends of said vertical rods and thereby form a generally rectangular opening. The upper horizontal rod 54 serves to support, in combination with identical rods on a series of such stanchions the generally rectangular frame 16. The lower rod 56 completes a generally rectangular brace for the stanchion and provides a frame of reference for inserting the vertical members into the water bed.

In order to support the parallel relationship of the horizontal members a pair of downwardly arched rods 58 and 60 are welded between the horizontal members. The arcuate contour of the connecting point of the arches with the horizontal rod 54 minimizes any tendency for the support to puncture or otherwise foul the frame netting 30 and/or envelope netting.

At least one element 62 and 64 of each of said downwardly arched rods 58 and 60, respectively, extends beyond the lower horizontal rod 56 and operably projects into the waterbed to facilitate secure placement of each stanchion upon and into the waterbed.

Finally each vertical rod 50 and 52 is formed with an upper handling element 66 and 68, respectively, which may comprises turned out or curled under elements suitable to grasp to manipulate and set the stanchions.

Figure 6:
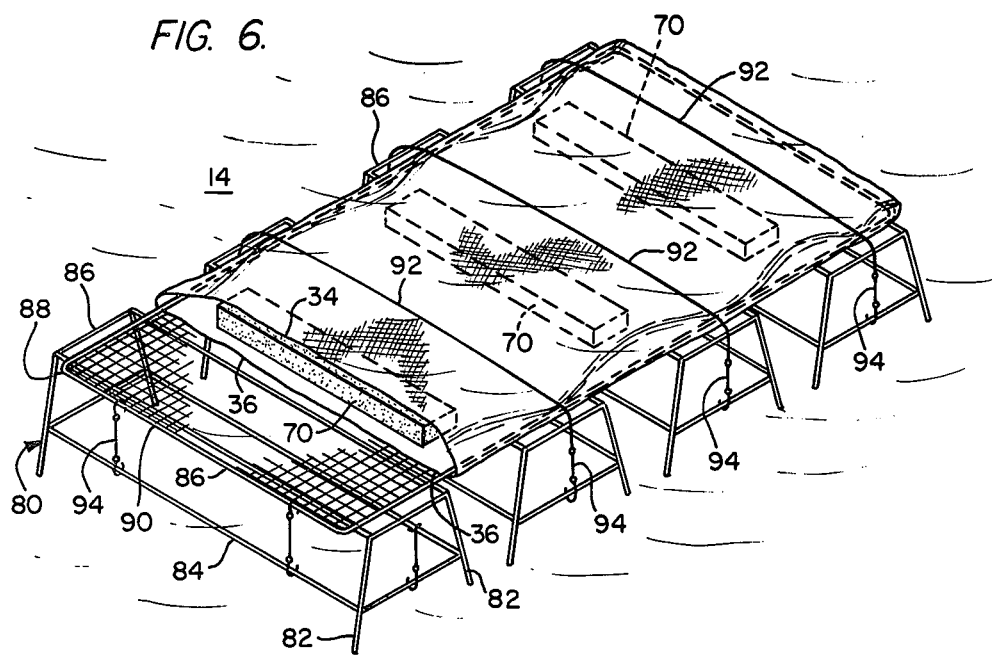
FIG. 6 is a detailed axonometric view of another preferred embodiment of the shellfish mariculture system which has been partially broken away to reveal detail of the subject embodiment.

Referring to FIG. 6 there will be seen an alternate preferred embodiment of the invention. In this embodiment of the subject mariculture apparatus, the upper portion 34 of the envelope 18 is supported above the lower portion 36 by a plurality of members 70 which are buoyant in water. Buoyant members 70 may be composed of polystyrene foam or the like and are connected to the upper portion 34 of the envelope. Accordingly if the water surface is higher than the envelope the buoyant members will raise or elevate the upper portion 34 of the envelope above the lower portion thereof to permit a flow of water through the envelope, etc. as discussed above.

Figure 7:
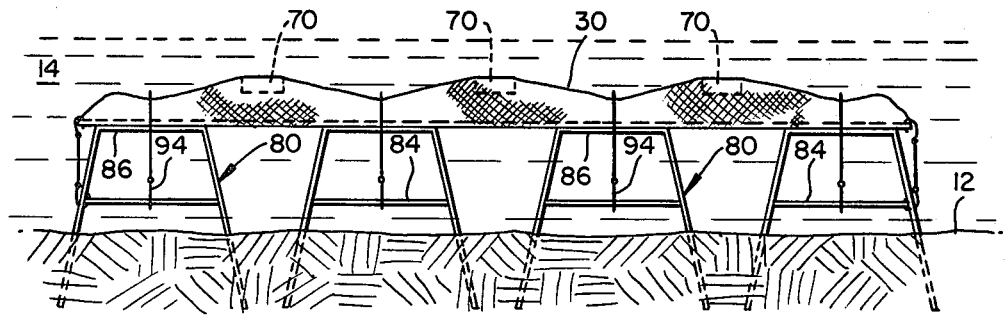
FIG. 7 is a side elevational view of the mariculture system depicted in FIG. 6.

In addition to an alternative envelope support structure the stanchion assemblies are modified in the alternate preferred embodiment. As seen in FIGS. 6 and 7 the stanchions 80 of the subject embodiment comprise truncated pyramid structures formed from bar stock. Each stanchion has four outwardly slooped legs 82, an intermediate zone of horizontal braces 84 and an upper rectangular member 86 of bar stock which forms a generally horizontal surface to support a rectangular frame 88 in a horizontal posture within the body of water. The frame is fitted with a "cargo netting" of crossing strips of nylon fabric 90 which in turn supports the mariculture envelope 18.

In this embodiment, in order to securely retain the envelope and frame upon the truncated pyramid stanchions 80 a plurality of retainer elements 92 are looped over the envelope and secured to the horizontal braces 84 of the stanchions.

In order to facilitate a resilient but secure attachment each of the retaining elements 92 is provided with an elastic segment 94 to resilient retain the envelope 18 upon the frame 88.

SUMMARY OF MAJOR ADVANTAGES

After reading and understanding the foregoing description of the invention, in conjunction with the drawings, it will be appreciated that several distinct advantages of the subject shellfish mariculture apparatus are obtained.

Without attempting to set forth all of the desirable features of the instant system at least some of the major advantages of the invention include the unique combination of a frame member with a member contacting an upper portion of the open mesh envelope to elevate the upper portion of the envelope above a lower portion thereof. In one preferred embodiment this member comprises a three dimensional insert within the envelope and in another embodiment this member comprises a buoyant member connected to an upper portion of the envelope.

The series of stanchion assemblies elevate the shellfish above a marine floor and facilitate elimination of metabolic wastes as the shellfish mature. Moreover ambulatory crabs do not tend to climb to elevations of a foot or so above the bottom. Further, swimming crabs which are small enough to have invaded the envelope at high water tend to drop out as the tide receeds and molt to an enlarged state, too large to reenter the envelope.

The individual concave nature of each mesh support section between adjacent braces of the frame operably maintains an even distribution of the shellfish within the mariculturing apparatus.

The subject apparatus may be facilely installed at any tide, moved and inspected as desired. In addition, harvesting is facilitated and does not require laborous digging.

In the event it is desired to slow the growth rate of the shellfish, in response to a sluggish market, the frame and envelopes may be placed directly upon the bottom in a winterized mode which will inhibit growth rates.

In describing the invention, reference has been made to preferred embodiments and illustrative advantages of the invention. Those skilled in the art, however, and familiar with the instant disclosure of the subject invention, may recognize additions, deletions, modification, substitutions and/or other changes which will fall within the purview of the subject invention and claims.

I claim:

1. A shellfish mariculture apparatus for nurturing clams, oysters, scallops and the like from an infantile seed stage to commercial maturity, said apparatus comprising:

frame means operable to be positioned within an aquatic environment;

envelope means positioned upon said frame means and being generally coextensive therewith for enhousing shellfish during a nurturing period, said envelope means including a sleeve of open mesh material operable to be laid laterally upon said frame means and having a lower portion supported by said frame means, said sleeve being operably closed at the ends thereof and the interstices of said open mesh material being smaller than the infantile shellfish to be nurtured within said envelope means;

means operably contacting an upper portion of said sleeve means for elevating the upper portion of said sleeve means above a lower portion thereof; and means positionable upon the bed of a body of water and being operable to receive said frame means and support said frame means and envelope means above the bed of the body of water.

2. A shellfish mariculture apparatus for nurturing clams, oysters, scallops and the like as defined in claim 1 wherein said means operably contacting an upper portion of said sleeve comprises:

at least one three dimensional element sized to be received within the interior of said envelope means for operably elevating the upper portion of said sleeve above a lower portion thereof.

3. A shellfish mariculture apparatus for nurturing clams, oysters, scallops and the like as defined in claim 2 wherein said three dimensional element comprises:
a continuous rod having a pair of generally parallel longitudinally extending side lengths and an elevated connecting loop between each end of said side lengths.

4. A shellfish mariculture apparatus for nurturing clams, oysters, scallops and the like as defined in claim 3 wherein:
said connecting loops mutually extend inwardly toward each other from the end of said side lengths.

5. A shellfish mariculture apparatus for nurturing clams, oysters, scallops and the like as defined in claim 1 wherein said means operably contacting an upper portion of said sleeve comprises:
float means connected to the upper portion of said sleeve means for buoyantly supporting the upper portion of said sleeve means above the lower portion thereof.

6. A shellfish mariculture apparatus for nurturing clams, oysters, scallops and the like as defined in claim 1 wherein said means positionable upon the bed of the body of water comprises:
a plurality of stanchions positioned in series and projecting partially into the water bed, each stanchion including
a first pair of spaced parallel vertical rods and
a second pair of spaced parallel horizontal rods extending between said vertical rods and being connected to said vertical rods intermediate the ends thereof to form a generally rectangular opening.

7. A shellfish mariculture apparatus for nurturing clams, oysters, scallops and the like as defined in claim 6 and further comprising:
a pair of arched rods extending between said parallel horizontal rods for providing bracing for said horizontal rods.

8. A shellfish mariculture apparatus for nurturing clams, oysters, scallops and the like as defined in claim 7 wherein:
at least one member of each of said arched rods extends beyond the lower one of said second pair of spaced parallel horizontal rods and operably extends into the water bed to assist said vertical rods in securing the stanchion in an upright posture within a body of water.

9. A shellfish mariculture apparatus for nurturing clams, oysters, scallops and the like as defined in claim 1 wherein said means positionable upon the bed of a body of water comprises:
a plurality of stanchions positioned in series and projecting partially into the water bed, each stanchion including,
a truncated, pyramid shaped frame composed of rods and having an upper surface operable to receive said frame means.

10. A shellfish mariculture apparatus for nurturing clams, oysters, scallops and the like as defined in claim 9 wherein said means operably contracting an upper portion of said sleeve comprises:
a plurality of float means connected to the upper portion of said sleeve means for buoyantly supporting the upper portion of said sleeve means above the lower portion thereof.

11. A shellfish mariculture apparatus for nurturing clams, oysters, scallops and the like as defined in claim 10 wherein:
said plurality of floats are longitudinally spaced along said sleeve means and a retainer element is connected to each stanchion and looped over said envelope to offset an excessive buoyant lift provided by said float means and retain said envelopment means upon said frame means.

12. A shellfish mariculture apparatus for nurturing clams, oysters, scallops and the like as defined in claim 1 wherein said frame means comprises:
a rectangular frame having longitudinal and crossing elements and an overlying flexible mesh grid and having planar rectangular dimensions greater than said frame such that a plurality of individual concave pockets will be formed by said flexible mesh grid within said frame.

* * * * *